(12) United States Patent
Hatrick et al.

(10) Patent No.: US 6,663,042 B2
(45) Date of Patent: Dec. 16, 2003

(54) AIRCRAFT PROPULSIVE POWER UNIT

(75) Inventors: Michael John Hatrick, Belfast (GB); Joel David Bennett, County Down (GB); Finbarr McEvoy, County Down (GB); Hugh Keith Campbell, County Down (GB); William Edwin Beattie, County Down (GB)

(73) Assignee: Short Brothers PLC, Belfast (IE)

( * ) Notice: Subject to any disclaimer, the term of this patent is extended or adjusted under 35 U.S.C. 154(b) by 0 days.

(21) Appl. No.: 09/974,720

(22) Filed: Oct. 9, 2001

(65) Prior Publication Data

US 2002/0100837 A1 Aug. 1, 2002

(30) Foreign Application Priority Data

Oct. 19, 2000 (GB) ................................................ 0025666

(51) Int. Cl.[7] ................................................. F02K 3/04
(52) U.S. Cl. ................................... 244/110 B; 60/226.2
(58) Field of Search ............................. 244/110 B, 125, 244/23 D; 60/226.2, 230; 239/265.19, 265.23

(56) References Cited

U.S. PATENT DOCUMENTS

| 5,575,147 A | 11/1996 | Nikkanen .................. 60/226.2 |
| 5,655,360 A | 8/1997 | Butler ........................ 60/226.2 |
| 6,151,883 A | * 11/2000 | Hatrick et al. |
| 6,256,980 B1 | * 7/2001 | Lecordix et al. |
| 6,438,942 B2 | * 8/2002 | Fournier et al. |
| 2002/0007625 A1 | 1/2002 | Fournier et al. ........... 60/226.2 |

FOREIGN PATENT DOCUMENTS

| EP | 0 779 429 A2 | 6/1997 |
| EP | 1 176 302 A1 | 1/2002 |
| GB | 1 104 764 | 2/1968 |
| GB | 2 314 818 A | 1/1998 |
| GB | 2347126 | 8/2000 |
| WO | WO 96/34193 | 10/1996 |

* cited by examiner

Primary Examiner—Peter M Poon
Assistant Examiner—Timothy D Collins
(74) Attorney, Agent, or Firm—Fulbright & Jaworski L.L.P.

(57) ABSTRACT

A thrust reversing arrangement for an aircraft turbofan propulsive power unit includes a flow redirecting structure which has reverse flow enhancing sub-structures comprising: (i) a cavity which is so dimensioned as to generate a back pressure which supports redirection of flow; (ii) a cascade assembly which provides a flow control slot so dimensioned as to optimize reverse thrust for predetermined fan duct flow conditions; (iii) an obstructing duct wall portion having a leading edge so positioned as to form a leakage slot providing controlled leakage of forward flow; (iv) a box structure, the dimensions of which are such as to optimize back pressure in the cavity; and (v) provision for gaseous fluid under static pressure from the fan duct to load the redirecting structure to the inoperative position.

15 Claims, 6 Drawing Sheets

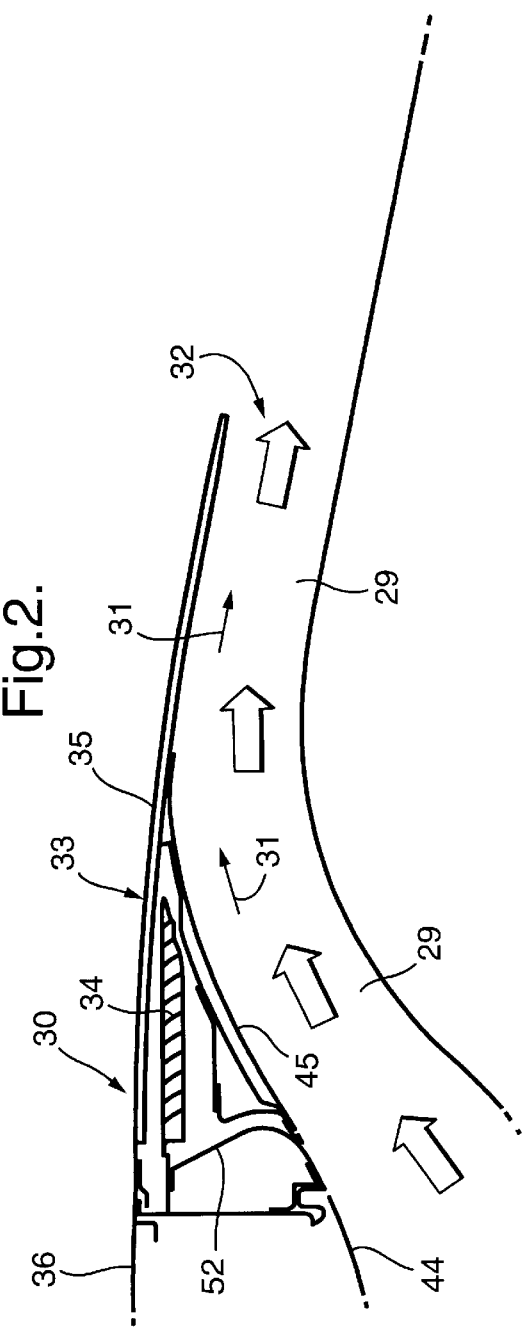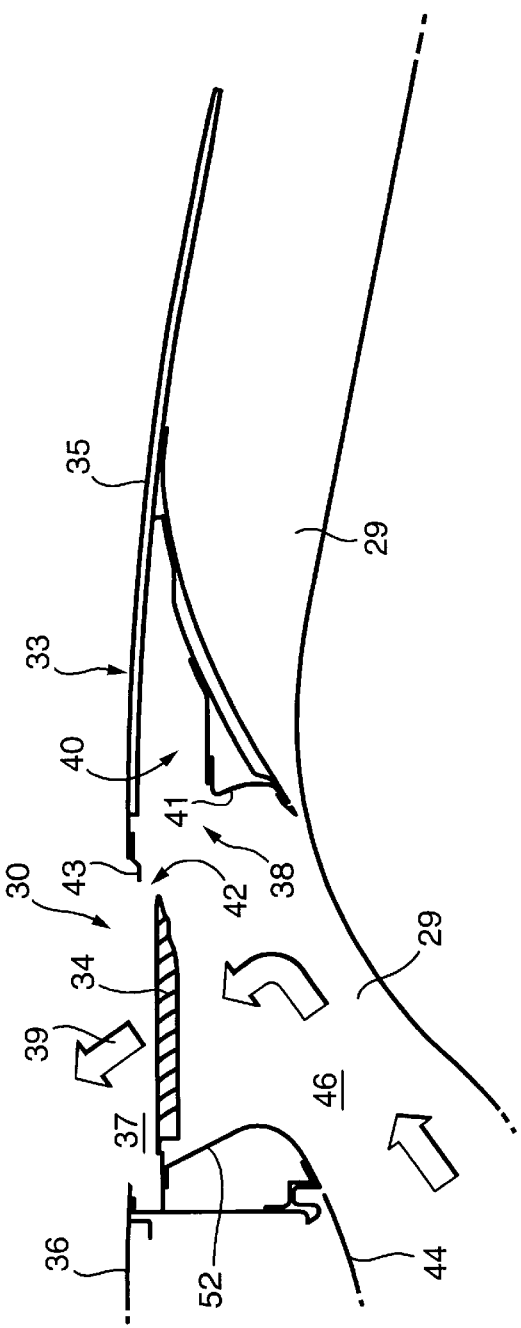

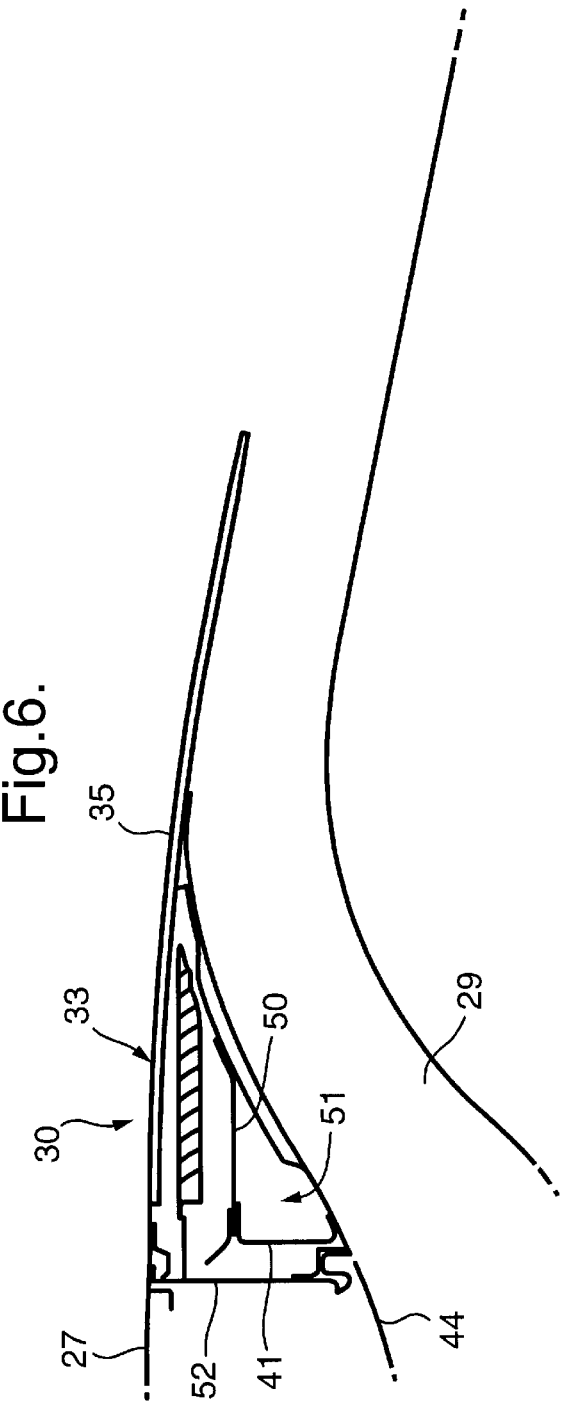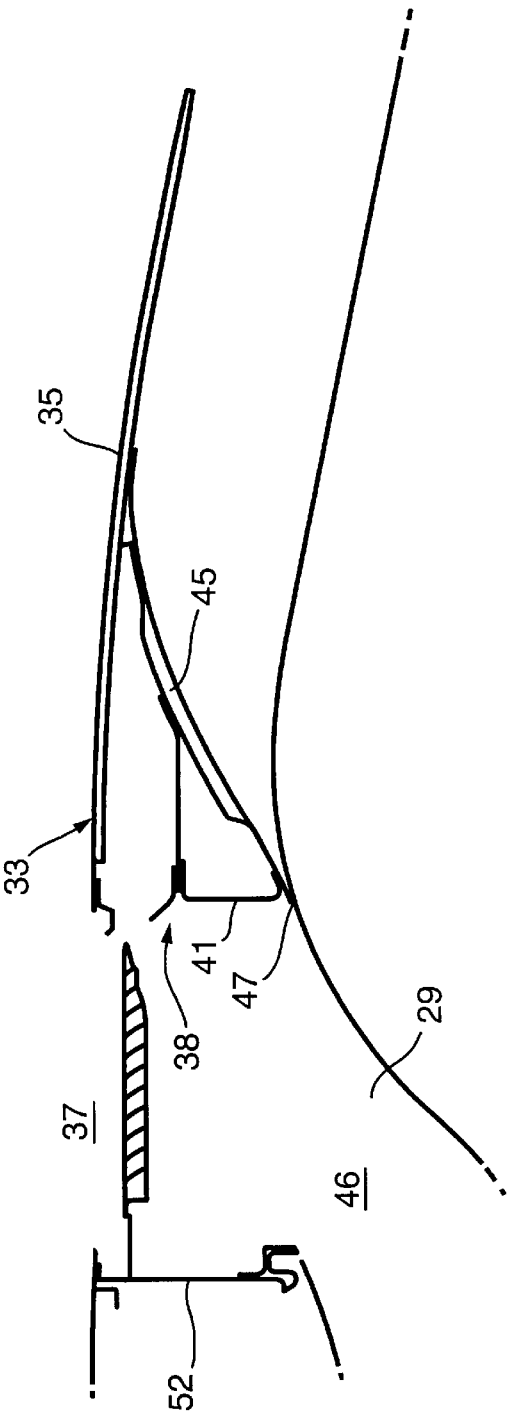

AIRCRAFT PROPULSIVE POWER UNIT

BACKGROUND OF THE INVENTION

The present invention relates to aircraft propulsive power units and is particularly concerned with an aircraft propulsive power unit comprising an efflux duct in which gaseous fluid is conducted in a predetermined first flow path for discharge from an exit end of the duct in the production of forward thrust, and a thrust reversing arrangement which in an operative disposition redirects gaseous fluid flowing in the first flow path into a second flow path to produce reverse thrust.

Prior GB 2314818A discloses a thrust reversing arrangement having a flow redirecting structure which includes a redirecting downstream wall against which fluid flow in the first flow path impinges to turn the flow into the second flow path and an upstream wall round which the fluid flow turns and which is so formed as to generate vortices which prevent or delay separation of the boundary layer from the boundary surface.

The propulsive power unit disclosed in GB2314818A is a turbofan power unit which includes a nacelle having a cowl structure to support ambient flow thereover and which in the operative disposition of the redirecting structure occupies a position in which it presents a cowl opening in the cowl structure to allow flow in the second flow path. A cascade assembly extends rearwardly across the cowl opening from a forward end on which it is cantilevered and is so mounted as to extend across the second flow path. It is received within a cavity formed in the redirecting structure when the latter is moved to its inoperative disposition.

SUMMARY OF THE INVENTION

When the redirecting structure is moved into its operative disposition in the reversing arrangement disclosed in GB2314818A, the radially outer edge of the downstream wall takes up a position adjacent the rearward end of the cascade assembly to redirect fluid flow directly into and through the cascade assembly.

In the reversing arrangement disclosed in GB2314818A means are provided on the upstream wall to improve the effectiveness of the upstream wall, thus promoting improved flow turning. Although the proposals put forward in regard to the upstream wall can be regarded as an improvement, the relative dispositions of the cascade assembly and the configuration of the downstream wall are not regarded as satisfactory for producing optimum reverse flow conditions.

It is an object of the present invention to provide a flow redirecting structure having one or more features taken individually or in combination which lead to an improved structure and improved reverse flow characteristics.

According to a first aspect of the present invention there is provided an aircraft propulsive power unit comprising an efflux duct in which gaseous fluid is conducted in a predetermined first flow path for discharge from an exit end of the duct in the production of forward thrust, and a thrust reversing arrangement which in an operative disposition redirects gaseous fluid flowing in the first flow path into a second flow path to produce reverse thrust, wherein the reversing arrangement has a flow redirecting structure which is displaceable between an operative disposition and an inoperative disposition and which comprises a flow redirecting zone which intercepts fluid flow in the first flow path and redirects it into the second flow path when the redirecting structure moves to the operative disposition, characterised in that the flow redirecting zone includes a cavity which so forms part of the flow redirecting zone and is so dimensioned as to generate a back pressure which supports redirection of flow.

In an embodiment of the invention according to its first aspect and as hereinafter to be described the flow redirecting zone includes a redirecting wall portion which supports redirection of flow. The redirecting wall portion is so dimensioned and configured as to provide optimisation of back pressure generated by the cavity for predetermined efflux duct flow conditions.

In embodiments of the invention according to its first aspect and as hereinafter to be described the propulsive power unit is a turbofan power unit including a fan duct and the efflux duct is the fan duct of the turbofan unit. The turbofan unit includes a nacelle having a cowl structure to support ambient flow thereover and the flow redirecting structure includes a cowl portion which in the inoperative disposition of the redirecting structure forms part of the cowl structure and supports ambient flow thereover and in the operative disposition of the redirecting structure occupies a position in which it presents a cowl opening in the cowl structure to allow flow in the second flow path.

In an embodiment of the invention according to its first aspect and as hereinafter to be described the thrust reversing arrangement includes a cascade assembly which is so mounted as to extend across the second flow path and which is received within the cavity formed in the flow redirecting zone when the redirecting structure is moved from its operative disposition to its inoperative disposition. The redirecting structure in the inoperative disposition takes up a forward disposition with a leading edge of the cowl portion abutting a trailing edge of an adjacent cowl portion and in the operative disposition takes up a rearward disposition with the leading edge of the cowl portion spaced from the trailing edge of the adjacent cowl portion to provide the cowl opening. The cascade assembly extends rearwardly across the cowl opening from a forward end from which it is cantilevered and terminates at a rearward end at a position in which it is forwardly spaced from the leading edge of the cowl portion when the redirecting structure is in the operative disposition thereby to provide in the second flow path a flow control slot between the rearward end of the cascade assembly and the leading edge of the cowl portion, with the control slot being so dimensioned as to optimise reverse thrust for predetermined fan duct flow conditions.

According to a second aspect of the present invention there is provided an aircraft propulsive power unit comprising an efflux duct in which gaseous fluid is conducted in a predetermined first flow path for discharge from an exit end of the duct in the production of forward thrust, and a thrust reversing arrangement which in an operative disposition redirects gaseous fluid flowing in the first flow path into a second flow path to produce reverse thrust, wherein the reversing arrangement has a flow redirecting structure which is displaceable between an operative disposition and an inoperative disposition and which comprises a flow redirecting zone which intercepts fluid flow in the first flow path and redirects it into the second flow path when the redirecting structure moves to the operative disposition, wherein the propulsive power unit is a turbofan power unit including a fan duct, wherein the efflux duct is the fan duct of the turbofan unit, wherein the turbofan unit includes a nacelle having a cowl structure to support ambient flow thereover, wherein the flow redirecting structure includes a cowl portion which in the inoperative disposition of the redirecting structure forms part of the cowl structure to support ambient flow and in the operative disposition of the redirecting structure occupies a position in which it presents a cowl opening in the cowl structure to allow flow in the second flow path, wherein the redirecting structure in the inoperative disposition takes up a forward disposition with a leading edge of the cowl portion abutting a trailing edge of an adjacent cowl portion and in the operative disposition takes up a rearward disposition with the leading edge of the cowl portion spaced from the trailing edge of the adjacent cowl portion to provide the cowl opening, and wherein a cascade assembly extends rearwardly across the cowl opening from a forward end from which it is cantilevered and the cascade assembly terminates at a rearward end at a position in which it is forwardly spaced from the leading edge of the cowl portion when the redirecting structure is in the operative disposition thereby to provide in the second flow path a flow control slot between the rearward end of the cascade assembly and the leading edge of the cowl portion, with the control slot being so dimensioned as to optimise reverse thrust for predetermined fan duct flow conditions.

In an embodiment of the invention according to its first and second aspects and as hereinafter to be described provision is made for the mounting on the leading edge of the cowl portion a baffle which is so chosen and dimensioned as to optimise the control slot dimension for a predetermined fan duct flow condition. The control slot is furthermore so dimensioned as to optimise back pressure generated by the cavity in the flow redirecting zone.

In an embodiment of the invention according to its first and second aspects and as hereinafter to be described the fan duct includes a fan duct wall which supports fluid flow in the first flow path and the redirecting structure includes a duct wall portion which in the inoperative disposition of the redirecting structure forms part of the fan duct wall and supports flow in the first flow path whilst preventing flow in the second flow path and in the operative disposition of the redirecting structure occupies a position in which it presents a duct opening in the fan duct wall to allow flow in the second flow path. The cascade assembly extends across the second flow path in the region thereof between the duct opening and the cowl opening to control fluid flow in the second flow path. The duct wall portion in the operative disposition of the redirecting structure occupies an obstructing position in which it obstructs flow in the fan duct in the first flow path. The duct wall portion in the obstructing position has its leading edge so positioned as to form a leakage slot providing controlled leakage flow in the first flow path.

According to a third aspect of the present invention there is provided an aircraft propulsive power unit comprising an efflux duct in which gaseous fluid is conducted in a predetermined first flow path for discharge from an exit end of the duct in the production of forward thrust, and a thrust reversing arrangement which in an operative disposition redirects gaseous fluid flowing in the first flow path into a second flow path to produce reverse thrust, wherein the reversing arrangement has a flow redirecting structure which is displaceable between an operative disposition and an inoperative disposition and which comprises a flow redirecting zone which intercepts fluid flow in the first flow path and redirects it into the second flow path when the redirecting structure moves to the operative disposition, wherein the propulsive power unit is a turbofan power unit including a fan duct, wherein the efflux duct is the fan duct of the turbofan unit, wherein the fan duct includes a fan duct wall which supports fluid flow in the first flow path and wherein the redirecting structure includes a duct wall portion which in the inoperative disposition of the redirecting structure forms part of the fan duct wall and supports flow in the first flow path whilst preventing flow in the second flow path, wherein the duct wall portion in the operative disposition of the redirecting structure occupies an obstructing position in which it obstructs flow in the fan duct in the first flow path and wherein the duct wall portion in the obstructing position has its leading edge so positioned as to form a leakage slot providing controlled leakage flow in the first flow path.

In an embodiment of the invention according to its third aspect and as hereinafter to be described, the leading edge of the duct wall portion is so dimensioned and structured as to provide for choking of flow when it passes through the leakage slot and a consequent reduction in leakage flow through the slot.

In an embodiment of the invention according to its third aspect and as hereinafter to be described, the redirecting wall portion extends from the leading edge of the duct wall portion to a forward end of a shelf portion of the redirecting structure. The inner and outer side boundaries of the cavity are formed by the shelf portion and the cowl portion. The cavity extends rearwardly to an end boundary formed by the duct wall portion. The shelf portion extends from the redirecting wall portion rearwardly to the duct wall portion to form with the redirecting wall portion and the duct wall portion a box structure.

In an embodiment of the invention according to its third aspect the redirecting structure includes sealing means to seal off the redirecting wall portion from fluid flow in the fan duct when the redirecting structure is in the inoperative disposition and provision is made to allow fluid under static pressure from the fan duct to flow into the box structure when the redirecting structure is in the inoperative disposition to load the redirecting structure in the direction of the inoperative disposition.

According to a fourth aspect of the present invention there is provided an aircraft propulsive power unit comprising an efflux duct in which gaseous fluid is conducted in a predetermined first flow path for discharge from an exit end of the duct in the production of forward thrust, and a thrust reversing arrangement which in an operative disposition redirects gaseous fluid flowing in the first flow path into a second flow path to produce reverse thrust, wherein the reversing arrangement has a flow redirecting structure which is displaceable between an operative disposition and an inoperative disposition and which comprises a flow redirecting zone which intercepts fluid flow in the first flow path and redirects it into the second flow path when the redirecting structure moves to the operative disposition, wherein the flow redirecting zone includes a redirecting wall portion which supports redirection of flow, wherein the propulsive power unit is a turbofan power unit including a fan duct, wherein the efflux duct is the fan duct of the turbofan unit, wherein the redirecting wall portion forms part of a box structure, wherein the redirecting structure includes sealing means to seal off the redirecting wall portion from fluid flow in the fan duct when the redirecting structure is in the inoperative disposition, and wherein provision is made to allow fluid under static pressure from the fan duct to flow into the box structure when the redirecting structure is in the inoperative disposition to load the redirecting structure in the direction of the inoperative position.

In an embodiment of the invention according to its fourth aspect and as hereinafter to be described, the redirecting structure and the fan duct together form a first displaceable sub-assembly which extends round one half of the turbofan unit and a second displaceable sub-assembly which extends round the other half of the turbofan unit and the box structure comprises a first box portion which extends round the first displaceable sub-assembly and a second box portion which extends round the second displaceable sub-assembly. The first and second box portions are open ended to provide for fluid under static pressure from the fan duct to flow into the box portions to load the redirecting structure in the direction of the inoperative disposition.

In an embodiment of the invention according to its first aspect and as hereinafter to be described, the redirecting structure includes an upstream wall round which fluid flow turns and which is of such convex form as to support adherence of the redirected flow and the redirecting wall portion is so constructed as to conform to the upstream wall when the redirecting structure is in its inoperative disposition.

In an alternative embodiment of the invention according to its first aspect and as hereinafter to be described, the redirecting wall portion of the flow redirecting structure is of planar or substantially planar form and the thrust reversing arrangement includes an upstream wall which extends from the upstream end of the duct opening to an upstream end of the cowl opening and which is so constructed as to conform to the redirecting wall portion.

According to a fifth aspect of the present invention, there is provided an aircraft propulsive power unit comprising an efflux duct in which gaseous fluid is conducted in a predetermined first flow path for discharge from an exit end of the duct in the production of forward thrust, and a thrust reversing arrangement which in an operative disposition redirects gaseous fluid flowing in the first flow path into a second flow path to produce reverse thrust, wherein the reversing arrangement has a flow redirecting structure which is displaceable between an operative disposition and an inoperative disposition and which comprises a flow redirecting zone which intercepts fluid flow in the first flow path and redirects it into the second flow path when the redirecting structure moves to the operative disposition, wherein the flow redirecting zone includes a redirecting wall portion which supports redirection of flow, wherein the propulsive power unit is a turbofan power unit including a fan duct, wherein the efflux duct is the fan duct of the turbofan unit, wherein the fan duct includes a fan duct wall which supports fluid flow in the first flow path and wherein the redirecting structure includes a duct wall portion which in the inoperative disposition of the redirecting structure forms part of the fan duct wall and supports flow in the first flow path whilst preventing flow in the second flow path, wherein the duct wall portion in the operative disposition of the redirecting structure occupies an obstructing position in which it obstructs flow in the fan duct in the first flow path, wherein the redirecting wall portion of the redirecting structure is of planar or substantially planar form and wherein the redirecting structure includes an upstream wall which is so constructed as to conform to the redirecting wall portion.

In an embodiment of the invention according to its fifth aspect and as hereinafter to be described the redirecting wall portion extends from a forward extremity of the duct wall portion radially in the direction of the leading edge of the cowl portion.

According to a sixth aspect of the present invention, there is provided an aircraft turbofan propulsive power unit comprising a core engine, a nacelle housing the engine and having a cowl structure to support ambient flow thereover, a fan duct in which gaseous fluid is conducted in a predetermined first flow path for discharge from an exit end of the duct in the production of forward thrust, and a thrust reversing arrangement which in an operative disposition redirects gaseous fluid flowing in the first flow path into a second flow path to produce reverse thrust, wherein the reversing arrangement has a flow redirecting structure which is displaceable between an operative disposition and an inoperative disposition and which comprises a flow redirecting zone which intercepts fluid flow in the first flow path and redirects it into the second flow path when the redirecting structure moves to the operative disposition, wherein the flow redirecting structure includes a cowl portion which in an inoperative disposition of the redirecting structure forms part of the cowl structure to support ambient flow with a leading edge of the cowl portion abutting a trailing edge of an adjacent cowl portion and in an operative disposition takes up a rearward disposition with the leading edge of the cowl portion spaced from the trailing edge of the adjacent cowl portion to provide a cowl opening, wherein the fan duct includes a fan duct wall which supports fluid flow in the first flow path and the redirecting structure includes a duct wall portion which in the inoperative disposition of the redirecting structure forms part of the fan duct wall and supports flow in the first flow path whilst preventing flow in the second flow path and in the operative disposition of the redirecting structure occupies an obstructing position in which it obstructs flow in the fan duct in the first flow path and in which it presents a duct opening in the fan duct wall to allow flow in the second flow path, and wherein the flow redirecting zone includes a redirecting wall portion which supports redirection of flow characterised in that:

the flow redirecting structure has at least one reverse flow enhancing sub-structure selected from the group consisting of:
(1) a cavity included in the flow redirecting zone which so forms part of the flow redirecting zone and is so dimensioned as to generate a back pressure which supports redirection of flow.
(2) the thrust reversing arrangement includes a cascade assembly which terminates at a rearward end at a position in which it is forwardly spaced from the leading edge of the cowl portion when the redirecting structure is in the operative disposition thereby to provide in the second flow path a flow control slot between the rearward end of the cascade assembly and the leading edge of the cowl portion, the control slot being so dimensioned as to optimise reverse thrust for predetermined fan duct flow conditions.
(3) the duct wall portion in the obstructing position has its leading edge so positioned as to form a leakage slot providing controlled leakage flow in the first flow path.
(4) the redirecting wall portion extends from the leading edge of the duct wall portion to a forward end of a pressure shelf portion of the redirecting structure, the inner and outer side boundaries of the cavity are formed by the pressure shelf portion and the cowl portion, and the shelf portion extends rearwardly to the duct wall portion to form with the redirecting wall portion and the duct wall portion a box structure, the dimensions of which are such as to optimise back pressure in the cavity, and
(5) the redirecting structure includes sealing means to seal off the redirecting wall portion from fluid flow in the fan duct when the redirecting structure is in the inoperative disposition, and provision is made to allow fluid under static pressure from the fan duct to flow into the box structure when the redirecting structure is in the inoperative disposition to load the redirecting structure in the direction of the inoperative position.

Embodiments of the invention according to its different aspects will now be described by way of example with reference to the accompanying drawings in which:

BRIEF DESCRIPTION OF THE DRAWINGS

FIG. 2 is a schematic sectional view of the thrust reversing arrangement of the propulsive power unit shown in FIG. 1 and showing a flow redirecting structure of the arrangement in an inoperative disposition.

FIG. 3 is a schematic sectional view of the thrust reversing arrangement shown in FIG. 2 with the flow redirecting structure in an operative disposition.

FIG. 6 is a schematic sectional view of a thrust reversing arrangement in an alternative form to that illustrated in FIG. 2 and showing a flow redirecting structure of the arrangement in an inoperative disposition.

FIG. 7 is a schematic sectional view of the thrust reversing arrangement shown in FIG. 6 with the flow redirecting structure in an operative disposition.

DETAILED DESCRIPTION OF THE PREFERRED EMBODIMENTS

Figure 1:
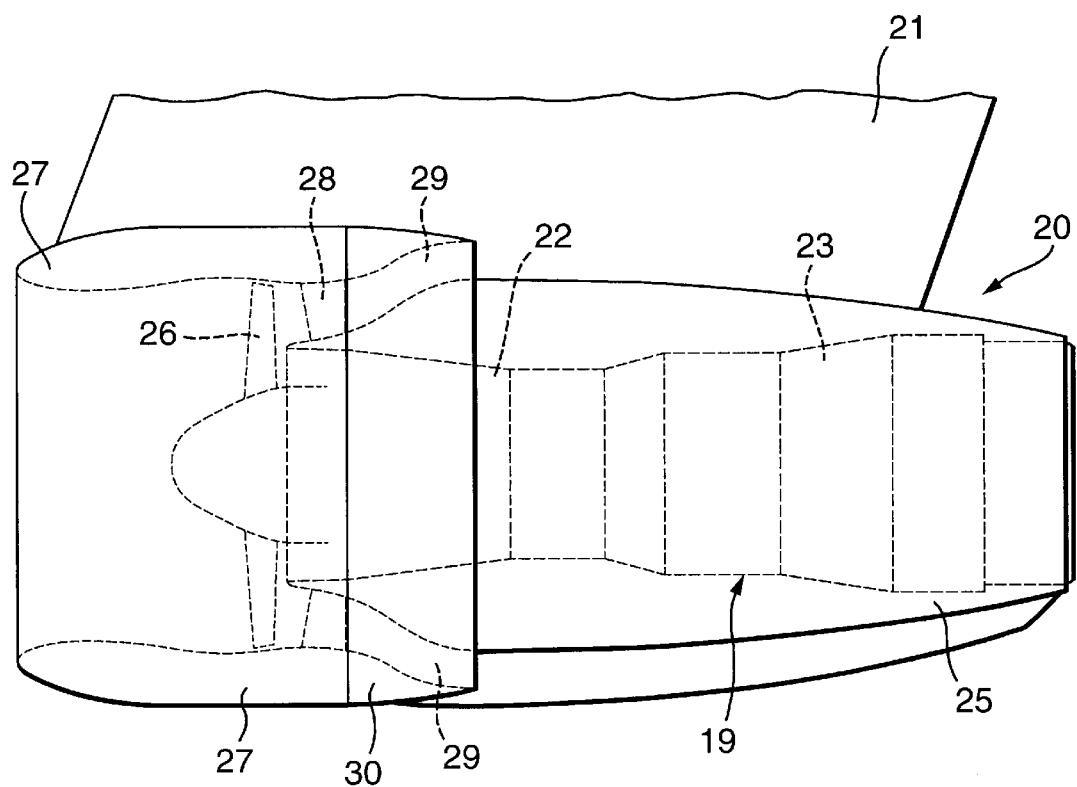
FIG. 1 is a schematic side elevation of an aircraft propulsive power unit embodying a thrust reversing arrangement according to the invention.

Referring first to FIG. 1, the propulsive power unit shown is in the form of a turbofan power unit 20 mounted from the wing or fuselage of an aircraft (not shown) by means of a pylon 21. The turbofan unit 20 includes a core engine 19 which has compressor stages 22 and turbine stages 23 in flow series and which is surrounded by a core engine casing 25.

The turbine stages 23 drive a front fan 26 which is located within a cowl structure 27 spaced from the engine casing by struts 28 to form an annular fan duct 29 between the cowl structure 27 and the casing 25. The cowl structure 27 terminates at its downstream end in a thrust reversing arrangement 30 as now to be described with reference to FIGS. 2 and 3.

The thrust reversing arrangement 30 shown in FIG. 2 is in its inoperative disposition. In this disposition, gaseous fluid is conducted in a first flow path 31 for discharge from an exit end 32 of the duct 29 in the production of forward thrust. The thrust reversing arrangement 30 comprises a flow redirecting structure 33 and a fixed cascade assembly 34.

As best seen in FIG. 3, the redirecting structure 33 includes a cowl portion 35 and is displaceable from the inoperative disposition shown in FIG. 2 in which the leading edge of the cowl portion 35 abuts a trailing edge of a forward cowl portion 36 to the operative disposition shown in FIG. 3 with the leading edge of the cowl portion 35 so spaced from the trailing edge of the cowl portion 36 as to provide a cowl opening 37.

The redirecting structure 33 includes a flow redirecting zone 38 which intercepts fluid flow in the duct 29 and redirects it into a second flow path 39 through the opening 37. The flow redirecting zone 38 includes a cavity 40 which so forms part of the flow redirecting zone and is so dimensioned as to generate a back pressure which supports redirection of flow.

The flow redirecting zone 38 further includes a redirecting wall portion 41 which supports redirection of flow and is so dimensioned and configured as to provide optimisation of back pressure generated by the cavity 40 for predetermined fan duct flow conditions.

It will be seen from FIG. 3 that the cascade assembly 34 extends rearwardly across the cowl opening 37 from its forward end from which it is cantilevered and that it terminates at a rearward end at a position in which it is forwardly spaced from the leading edge of the cowl portion 35 when the redirecting structure 33 is in the operative disposition. In this way, it provides in the second flow path 39 through the cowl opening 37 a flow control slot 42 between the rearward end of the cascade assembly 34 and the leading edge of the cowl portion 35.

The flow control slot 42 is so dimensioned as to optimise reverse thrust for predetermined fan duct flow conditions. Flow through the cowl opening 37 in the flow path 39 can best be regarded as a primary reverse thrust flow through the cascade assembly 34 and a secondary reverse thrust flow through the flow control slot 42 which can be adjusted to optimise redirection of flow in the flow redirecting zone 38.

To further this end, provision is made for the mounting on the leading edge of the cowl portion a baffle 43 so chosen and dimensioned as to optimise the dimension of the control slot 42 for a predetermined fan duct flow condition.

It will be appreciated that the cascade assembly 34 is so mounted as to be received within the cavity 40 when the redirecting structure is moved from its operative disposition shown in FIG. 3 to its inoperative disposition shown in FIG. 2.

Figure 4:
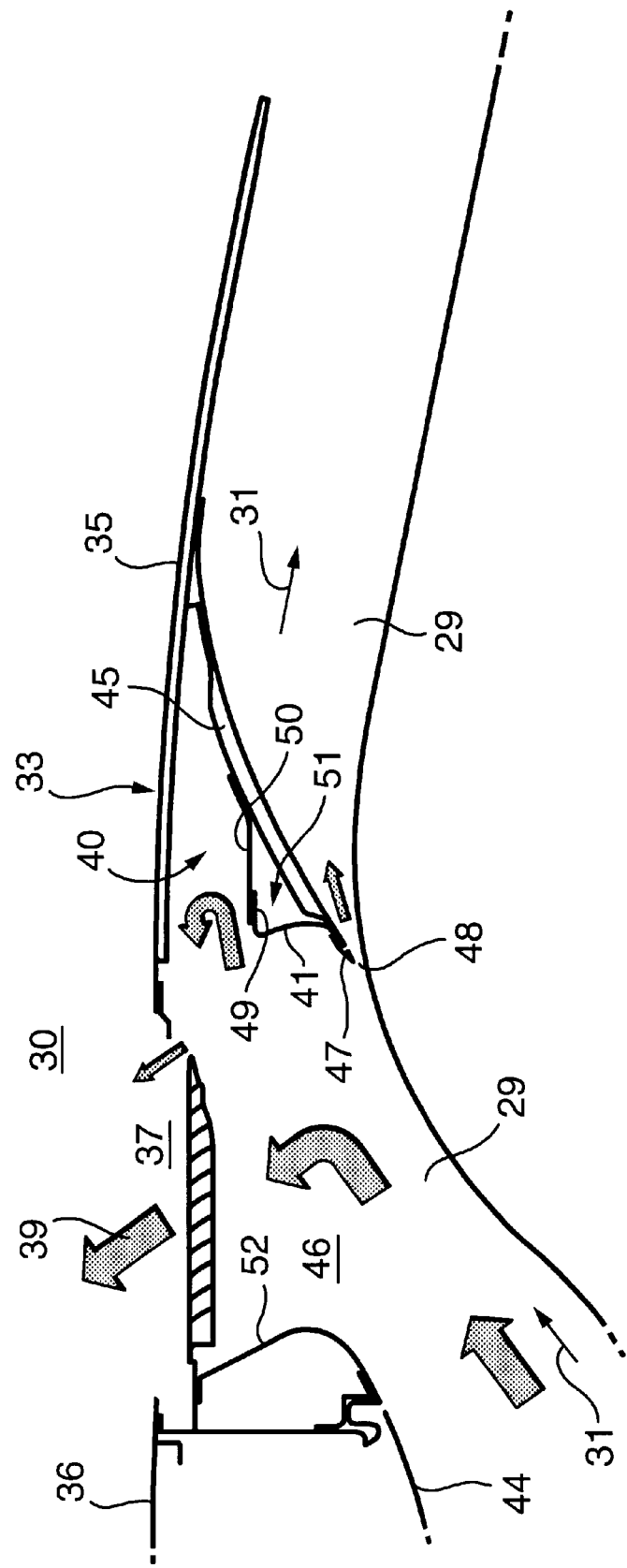
FIG. 4 is a schematic sectional view corresponding to that shown in FIG. 3 and drawn to an enlarged scale.

Referring now to FIG. 4, the fan duct 29 includes an outer fan duct wall 44 which supports fluid flow in the first flow path 31 and the redirecting structure 33 includes a duct wall portion 45 which in the inoperative disposition of the redirecting structure 33 shown in FIG. 2 forms part of the fan duct wall 44 and supports flow in the flow path 31 whilst preventing flow in the flow path 39 and in the operative disposition of the redirecting structure 33 occupies a position in which it presents a duct opening 46 to allow flow in the second flow path 39.

As will be seen from FIG. 4, the duct wall portion 45 in the operative disposition of the redirecting structure 33 occupies an obstructing position in which it obstructs flow in the fan duct 29 in the flow path 31. Furthermore, the duct wall portion 45 in the obstructing position has its leading edge 47 so positioned as to form a leakage slot 48 providing controlled leakage flow in the first flow path 31. The leading edge 47 of the duct wall portion 45 is so dimensioned and structured as to provide for choking of flow when the leakage flow passes through the leakage slot 48 thereby giving rise to a reduction in leakage flow through the slot.

Referring again to FIG. 4 it will be seen that the redirecting wall portion 41 extends from the leading edge 47 of the duct wall portion 45 to a forward end 49 of a shelf portion 50. As shown, the inner and outer side boundaries of the cavity 40 are formed by the shelf portion 50 and the cowl portion 35. The cavity 40 extends rearwardly to an end boundary formed by the inner surface of the duct wall portion 45. Furthermore, the shelf portion 50 extends from the redirecting wall portion 41 rearwardly to the duct wall portion 45 to form with the redirecting wall portion 41 and the duct wall portion 45 a box structure 51.

Figure 5:
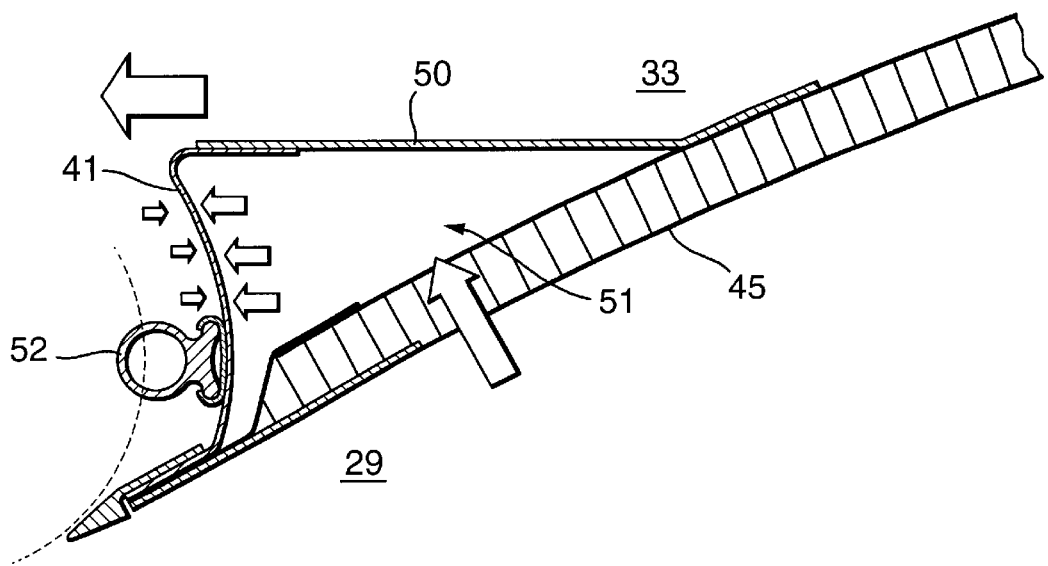
FIG. 5 is a schematic sectional view of part of the flow redirecting structure shown in FIG. 4 and drawn to an enlarged scale.

Referring now to FIG. 5 which shows the box structure 51 drawn to a large scale, it will be seen that sealing means 52 are provided to seal off the redirecting wall portion 41 from fluid flow in the fan duct 29 when the redirecting structure 33 is in the inoperative disposition. Provision is made to allow fluid under static pressure from the fan duct 29 to flow into the box structure 51 when the redirecting structure 33 is in the inoperative disposition shown in FIG. 2 to load the structure 33 in the direction of the inoperative position. By this means the inner surface of the redirecting wall portion 41 becomes exposed to fan duct static pressure whereas by appropriate location of the sealing means 52 that part of the redirecting wall portion 41 outboard of the sealing means 52 becomes exposed to external ambient pressure. As a result, the wall portion 41 becomes subject to a differential pressure between its inner and outer surfaces which result in a net force on the redirecting structure 33 in the direction of the inoperative disposition.

Provided the turbofan engine is running and producing a pressure in the fan duct 29, the provision of the box structure 51 and the sealing means 52 results in the structure 33 being aerodynamically loaded toward the inoperative disposition thereby giving the unit added safety against an in-flight inadvertent deployment of the thrust reversing arrangement.

In an embodiment of the invention not shown, the thrust reversing arrangement 30 and the fan duct 29 can together form part of C-duct sub-assemblies with a first displaceable C-duct sub-assembly extending around one half of the turbofan unit and a second displaceable C-duct sub-assembly around the other half of the turbofan unit. Where such provision is made the box structure 51 can take the form of a first box portion extending around the first C-duct sub-assembly and a second box portion extending around the second C-duct sub-assembly. With this provision the first and second box portions can be open-ended to provide for fluid under static pressure from the fan duct 29 to flow into the box portions to provide fan duct static pressure.

Referring again to FIGS. 2, 3 and 4, it will be seen that the thrust reversing arrangement includes an upstream wall 52 around which fluid flow turns and which is of such convex form as to support adherence of redirected flow to the cowl opening 37. The redirecting wall portion 41 as best seen in FIG. 3 or 4 is so constructed as to conform to the upstream wall 52 when the redirecting structure 33 is in the inoperative disposition.

While the upstream wall 52 is usually chosen to be of the convex form as illustrated in FIGS. 2, 3 and 4 in order to take advantage of the Coanda effect, an alternative form of redirecting wall portion 41 and upstream wall 52 can be provided as now to be described with reference to FIGS. 6 and 7.

A thrust reversing arrangement in its alternative form is shown in FIG. 6 in its inoperative disposition which corresponds to the inoperative disposition of the arrangement shown in FIG. 2 except to the extent that the redirecting wall portion 41 and the upstream wall 52 are of a different form.

As best seen in FIG. 7, which shows the flow redirecting structure 33 in its operative disposition, the redirecting wall portion 41 is of planar form and extends from a leading edge 47 of the wall duct portion 45 radially outwardly in the direction of the leading edge of the cowl portion 35. The upstream wall 52 extends from the upstream end of the duct opening 46 radially outwardly to an upstream end of the cowl opening 37.

In this alternative form, with the convex upstream wall omitted, the flow redirecting zone 38 including the redirecting wall portion 41 can be positioned forwardly and provide for a more complete blocking of the fan duct 29 when the redirecting structure 33 is in its operative disposition. The leakage slot as provided in the arrangement shown in FIGS. 2 to 4 is then unnecessary and complete blocking of the fan duct 29 more readily achieved.

Figure 8:
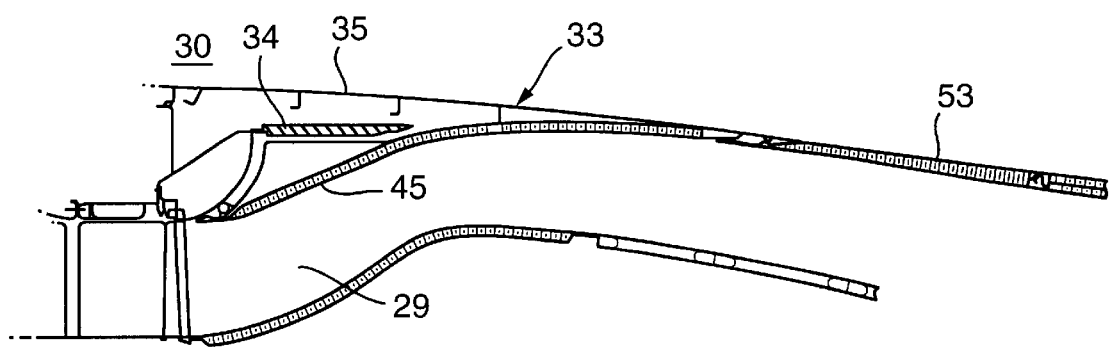
FIG. 8 is a schematic sectional view of a thrust reversing arrangement with a flow redirecting structure in an inoperative disposition and arranged within a propulsive power unit in an alternative location to that of the arrangement shown in FIG. 2.
Figure 9:
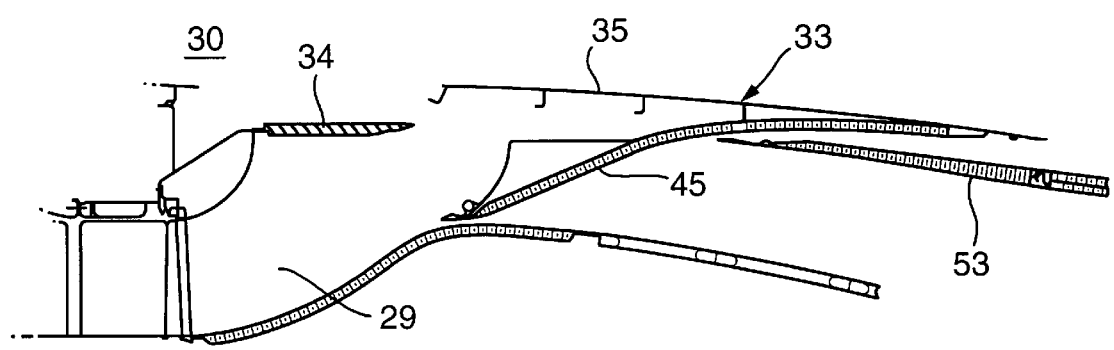
FIG. 9 is a schematic sectional view of the thrust reversing arrangement shown in FIG. 8 with the flow redirecting structure in an operative disposition.

While the thrust reversing arrangement hereinbefore described includes a short fan duct 29 where the trailing edge of the cowl portion 35 of the redirecting structure 33 leads to the exit 32 of the fan duct 29, the thrust reversing arrangement according to the invention in its different aspects can also be employed where a more extensive fan duct is required, as now to be described with reference to FIGS. 8 and 9.

The thrust reversing arrangement 30 shown in FIG. 8 takes up the same inoperative disposition as that described with reference to FIGS. 2 to 4. It will, however, be seen from FIG. 9 that the redirecting structure 33 is required to move to an operative disposition in which it extends over the top of a cowl portion 53 positioned to the rear of it. Provision must then be made for removing the cowl portion 53 in order for the flow redirecting structure 33 to be removed rearwardly for maintenance if required.

The invention according to its different aspects gives rise to the following benefits:

1) No blocker doors or associated mechanisms are required. The fan duct 29 is blocked through careful contouring and simple axial translation of the flow redirecting structure 33.
2) The fan duct 29 is nearly completely blocked and leakage flow reduced, thereby generating increased reverse thrust.
3) Increased reverse thrust effectiveness allows turbofan unit to be run at lower power, improving engine life.
4) The cascade assembly 34 is stationary, not translating and does not overhang engine fancase.
5) Actuators for the flow redirecting structure 33 do not have to sustain cascade assembly aerodynamic loads and can therefore be smaller and lighter.
6) Configuration of redirecting wall portion 41 and position of sealing means 52 ensures aerodynamic loading towards inoperative disposition of the structure 33.

What is claimed is:

1. An aircraft propulsive power unit comprising
an efflux duct in which gaseous fluid is conducted in a predetermined first flow path for discharge from an exit end of the duct in the production of forward thrust, and a thrust reversing arrangement which in an operative disposition redirects gaseous fluid flowing in the first flow path into a second flow path to produce reverse thrust, wherein
the reversing arrangement has a flow redirecting structure which is displaceable between an operative disposition and an inoperative disposition and which comprises a flow redirecting zone which intercepts fluid flow in the first flow path and redirects it into the second flow path when the redirecting structure moves to the operative disposition, the propulsive power unit is a turbofan power unit including a fan duct, the efflux duct is the fan duct of the turbofan unit, the turbofan unit includes a nacelle having a cowl structure to support ambient flow thereover including a forward cowl portion, the flow redirecting structure includes a displaceable cowl portion which in the inoperative disposition of the redirecting structure forms part of the cowl structure to support ambient flow and in the operative disposition of the redirecting structure occupies a position in which it presents a cowl opening in the cowl structure to allow flow in the second flow path, the redirecting structure in the inoperative disposition takes up a forward disposition with a leading edge of the displaceable cowl portion abutting a trailing edge of the forward cowl portion and in the operative disposition takes up a rearward disposition with the leading edge of the displaceable cowl portion spaced from the trailing edge of the forward cowl portion to provide the cowl opening.

a cascade assembly extends rearwardly across the cowl opening from a forward end from which it is cantilevered: wherein (i) the cascade assembly terminates at a rearward end at a position in which it is forwardly spaced from the leading edge of the displaceable cowl portion when the redirecting structure is in the operative disposition thereby to provide a flow control slot between the rearward end of the cascade assembly and the leading edge of the displaceable cowl portion, (ii) the second flow path comprises a primary reverse thrust flow through the cascade assembly and a secondary reverse thrust flow through the control slot and (iii) a baffle is mounted on the leading edge of the displaceable cowl portion defining the trailing edge of the control slot when the redirecting structure is in the operative disposition and overlaps with the trailing edge of the forward cowl portion when the redirecting structure is in the inoperative disposition.

2. A unit according to claim 1, wherein
the control slot is so dimensioned as to optimize back pressure generated by the cavity in the flow redirecting zone.

3. A unit according to claim 1, wherein
the fan duct includes a fan duct well which supports fluid flow in the first flow path and the redirecting structure includes a duct wall portion which in the inoperative disposition of the redirecting structure forms part of the fan duct wall and supports flow in the first flow path whilst preventing flow in the second flow path and in the operative disposition of the redirecting structure occupies a position in which it presents a duct opening in the fan duct wall to allow flow in the second flow path.

4. The unit according to claim 3 wherein
the cascade assembly extends across the second flow path in the region thereof between the duct opening and the cowl opening to control fluid flow in the second flow path.

5. A unit according to claim 3 wherein
the duct wall portion in the operative disposition of the redirecting structure occupies an obstructing position in which it obstructs flow in the fan duct in the first flow path.

6. A unit according to claim 1 wherein
the leading edge of the duct wall portion is so dimensioned and structured as to provide for choking of flow when it passes through the leakage slot and a consequent reduction in leakage flow through the slot.

the duct wall portion in the obstructing position has its leading edge so positioned as to form a leakage slot providing controlled leakage flow in the first flow path.

7. A unit according to claim 6 wherein
the redirecting wall portion extends from the leading edge of the duct wall portion to a forward end of a shelf portion of the redirecting structure.

8. A unit according to claim 7 wherein
the inner and outer side boundaries of the cavity are formed by the shelf portion and the displaceable cowl portion.

9. A unit according to claim 8 wherein
the cavity extends rearwardly to an end boundary formed by the duct wall portion.

10. A unit according to claim 8 wherein
the shelf portion extends from the redirecting wall portion rearwardly to the duct wall portion to form with the redirecting wall portion and the duct wall portion a box structure.

11. A unit according to claim 10, wherein
the cowl structure, the redirecting structure and the fan duct extend circumferentially around the turbofan unit, the fan duct comprises an inner duct wall which extends circumferentially around the unit and a radially outwardly spaced outer duct wall and the duct wall portion of the redirecting structure forms part of the outer duct wall.

12. A unit according to claim 10 wherein
the redirecting structure includes sealing means to seal off the redirecting wall portion from fluid flow in the fan duct when the redirecting structure is in the inoperative disposition, and provision is made to allow fluid under static pressure from the fan duct to flow into the box structure when the redirecting structure is in the inoperative disposition to load the redirecting structure in the direction of the inoperative position.

13. An aircraft propulsive power unit comprising
an efflux duct in which gaseous fluid is conducted in a predetermined first flow path for discharge from an exit end of the duct in the production of forward thrust, and a thrust reversing arrangement which in an operative disposition redirects gaseous fluid flowing in the first flow path into a second flow path to produce reverse thrust, wherein the reversing arrangement has a flow redirecting structure which is displaceable between an operative disposition and an inoperative disposition and which comprises a flow redirecting zone which intercepts fluid flow in the first flow path and redirects it into the second flow path when the redirecting structure moves to the operative disposition, the flow redirecting zone includes a redirecting wall portion which supports redirection of flow, the propulsive power unit is a turbofan power unit including a fan duct, the efflux duct is the fan duct of the turbofan unit, the redirecting wall portion forms part of a box structure, the redirecting structure includes sealing means to seal off the redirecting wall portion from fluid flow in the fan duct when the redirecting structure is in the inoperative disposition, and communication of fluid under static pressure from the fan duct to flow into the box structure when the redirecting structure is in the inoperative disposition, the communication loading the redirecting structure in the direction of the inoperative position.

14. A unit according to claim 13 wherein the cowl structure, the redirecting structure and the fan duct together form a first displaceable sub-assembly which extends round one half of the turbofan unit and a second displaceable sub-assembly which extends round the other half of the turbofan unit and the box structure comprises a first box portion which extends round the first displaceable sub-assembly and a second box portion which extends round the second displaceable sub-assembly.

15. A unit according to claim 14 wherein the first and second box portions are open ended to provide for the communication of fluid under static pressure from the fan duct to flow into the box portions to load the redirecting structure in the direction of the inoperative disposition.

* * * * *